(12) United States Patent
Muyama et al.

(10) Patent No.: US 6,311,474 B2
(45) Date of Patent: *Nov. 6, 2001

(54) COMBINED CYCLE ELECTRIC POWER PLANT

(75) Inventors: Akimasa Muyama; Jun Yasuraoka, both of Takasago (JP)

(73) Assignee: Mitsubishi Heavy Industries, Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/381,611
(22) PCT Filed: Jan. 23, 1998
(86) PCT No.: PCT/JP98/00260
§ 371 Date: Sep. 23, 1999
§ 102(e) Date: Sep. 23, 1999
(87) PCT Pub. No.: WO99/37900
PCT Pub. Date: Jul. 29, 1999

(51) Int. Cl.$^7$ ...................................................... F02C 7/12
(52) U.S. Cl. ........................ 60/39.55; 60/39.182; 60/752
(58) Field of Search ............................. 60/39.182, 39.75, 60/39.55, 752

(56) References Cited

U.S. PATENT DOCUMENTS

| 5,640,840 | * | 6/1997 | Briesch | 60/39.05 |
| 5,687,572 | * | 11/1997 | Schrantz | 60/753 |
| 5,737,922 | * | 4/1998 | Schoenman | 60/752 |
| 6,065,282 | * | 5/2000 | Fukue | 60/39.182 |
| 6,128,895 | * | 10/2000 | Takahama | 60/39.182 |

FOREIGN PATENT DOCUMENTS

| 08319852 A | * | 12/1996 | (JP) | 60/39.182 |

* cited by examiner

Primary Examiner—Timothy S. Thorpe
Assistant Examiner—Ehud Gartenberg
(74) Attorney, Agent, or Firm—Oblon, Spivak, McClelland, Maier & Neustadt, P.C.

(57) ABSTRACT

A combined cycle power plant having a gas turbine plant and a steam turbine plant combined together is disclosed. Steam is used for cooling a high-temperature portion (5) to be cooled around the combustor (4) of the gas turbine (2). The power plant has an air duct (9), connected to a steam path (7) for supplying steam for cooling the high-temperature portion (5), for cooling this portion using air if the steam for cooling is insufficient, typically when the plant is activated or stopped, and the air duct includes a device for boosting the air to have a pressure higher than that inside a combustor (4) of the power plant. Accordingly, the combustor and attached piping arrangement can be protected from burning and the power plant can be safely and reliably operated for a long time.

10 Claims, 1 Drawing Sheet

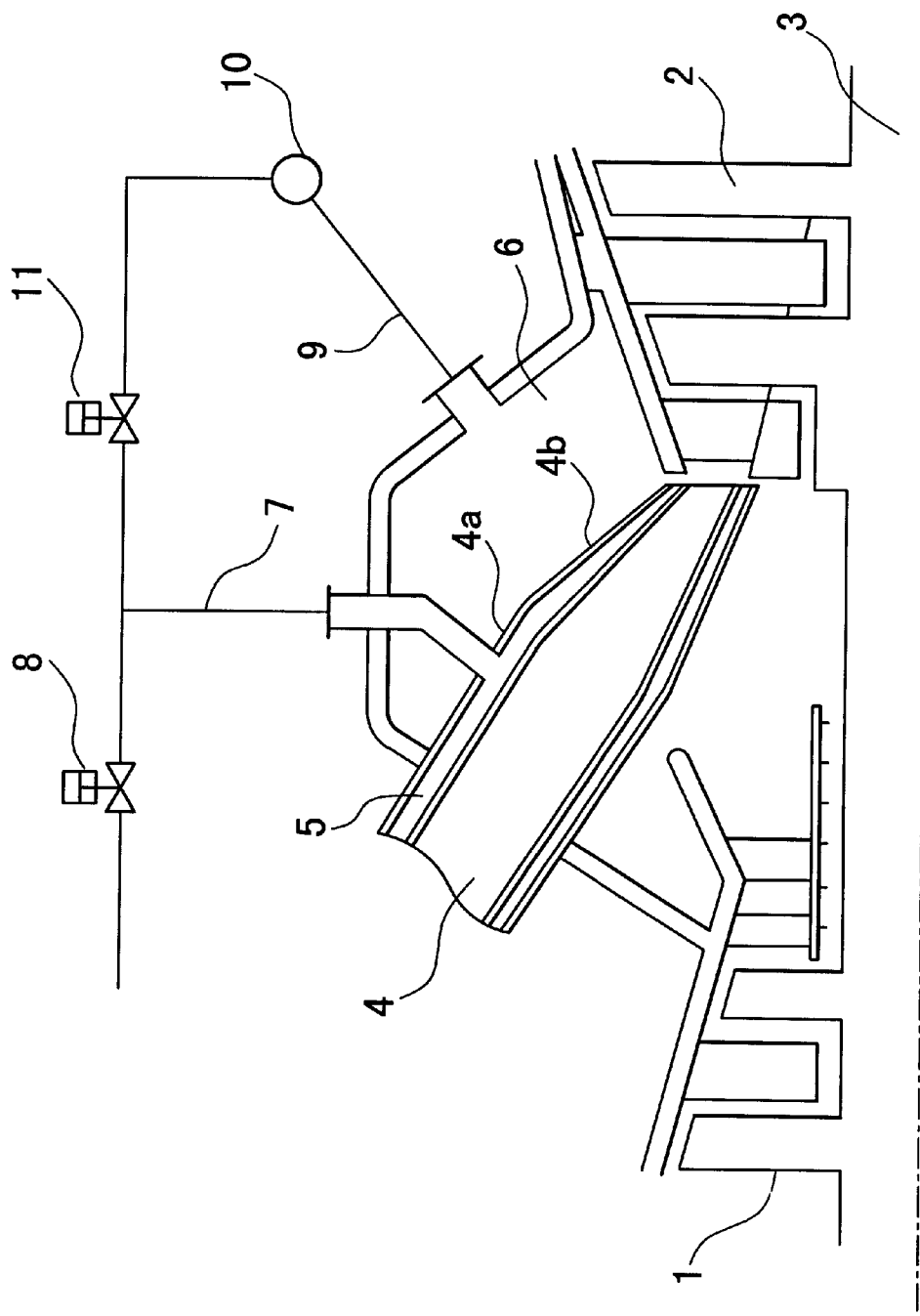

COMBINED CYCLE ELECTRIC POWER PLANT

TECHNICAL FIELD

The present invention relates to a combined cycle power plant including combined gas and steam turbine plants.

BACKGROUND ART

The combined cycle power plant is a power generation system which has combined gas and steam turbine plants. In this system, the gas turbine takes charge of a higher-temperature range of the thermal energy, while the steam turbine takes charge of the remaining lower-temperature range, thereby efficiently recovering and using the thermal energy. This is currently the most common power generation system.

In order to improve the efficiency, the development of the combined cycle power plant has been focused on how high the higher-temperature range of the gas turbine can be set.

To realize a higher-temperature range, a cooling system must be provided in consideration of the heat resistance of the turbine structure. Conventionally, air is used as a cooling medium in such a cooling system.

However, as long as air is used as the cooling medium, even if a desirable higher-temperature range can be achieved, the plant will inevitably suffer from (i) loss of power necessary for boosting the air (which was used for cooling) up to a specified pressure by using an internal air compressor, and (ii) lowering of the average gas temperature and thus the energy of the gas because the air used for cooling target portions is finally made flow through the passage (in the turbine) together with the high-temperature gas. As a result of the above effects (i) and (ii), it is very difficult to further improve the thermal efficiency.

In order to solve the above problem and to further improve the efficiency, another type of combined cycle power plant has been proposed, in which the steam is used as the cooling medium of the gas turbine instead of air as mentioned above.

Japanese Unexamined Patent Application, First Publication, No. Hei 5-163960 discloses an example thereof. Although this publication discloses the concept that steam is used as a cooling medium for gas turbine 13, it also has many problems.

For example, in this system, when the gas turbine is activated or stopped, cooling steam is not supplied to the high-temperature portion to be cooled because it is considered in this system that at these times (i.e., when starting or stopping), the thermal load is relatively low and the cooling operation is unnecessary.

On the other hand, the compressed air of the gas-turbine compressor is the only cooling medium used as a substitute for the cool steam in such a power plant. Therefore, if the high-temperature portion of the gas turbine must be cooled when the gas turbine is activated or stopped, the compressed air of the gas-turbine compressor must be used.

In the above system disclosed in Hei 5-163960, when the compressed air of the gas-turbine compressor is used as a substitute, air in the gas turbine chamber is extracted to be introduced into the original steam cooling system. Therefore, this air passes through piping, valves, or the like, and thus a pressure loss inevitably occurs.

Here, the combustor is the highest-temperature part of all the high-temperature parts in the gas turbine, and the inner pressure thereof is only a little lower than the pressure of air in the gas turbine chamber. Therefore, if the above-described cooling with air is employed, the air pressure in the cooling path must be lower than the pressure in the combustion atmosphere of the combustor.

Accordingly, if a small hole such as a pinhole exists in the structure for cooling the combustor, high-pressure combustion gas will enter the cooling path via the hole, and the combustor and attached piping arrangement may be locally heated or burned.

It is an object of the present invention to solve the above problems in the conventional system and to maintain the safety of the system, and to provide a combined cycle power plant which can reliably operate for a long time.

DISCLOSURE OF INVENTION

To achieve the above object, the present invention provides a combined cycle power plant having a gas turbine plant and a steam turbine plant combined together, the power plant comprising:

an exhaust heat recovery boiler for generating steam for driving the steam turbine by using exhaust heat from the gas turbine; and a steam cooling system for cooling a target high-temperature portion in the gas turbine by using steam, where superheated steam from the steam cooling system is recovered and used in the steam turbine, and wherein the power plant has an air duct, connected to a steam path for supplying steam for cooling the target high-temperature portion, for cooling this portion using air if the steam for cooling is insufficient typically when the plant is activated or stopped, and the air duct including means for boosting the air to have a pressure higher than that inside a combustor of the power plant.

Accordingly, if the supplied cool steam is insufficient (i) when the plant is activated or stopped or (ii) for another reason with respect to the operation of the plant, or if no cool steam is supplied because the cooling operation itself is unnecessary, then the pressure in the steam path can be maintained higher than that in the combustor, so that no gas enters from the combustor to the steam path. Therefore, the combustor and attached piping arrangement can be reliably protected.

In the above structure, a boost-up pressurizer may be inserted in the air duct. In this case, the pressure in the air duct, that is, in the steam path can be increased by the boost-up pressurizer so that this pressure can be maintained higher than that in the combustor. Therefore, the combustor and attached piping arrangement can be reliably protected, as explained above.

BRIEF DESCRIPTION OF THE DRAWINGS

FIG. 1 is a schematic diagram for explaining the general structure of the gas turbine plant of the combined cycle power plant as an embodiment according to the present invention.

MODES FOR CARRYING OUT THE INVENTION

Hereinbelow, an embodiment of the present invention will be explained in detail with reference to FIG. 1.

In the figure, reference numeral 1 indicates an air compressor, reference numeral 2 indicates a gas turbine, and air compressor 1 and gas turbine 2 are joined with each other via common shaft 3. Reference numeral 4 indicates a combustor having trunk portion 4a and tail pipe portion 4b, around which there is a high-temperature portion 5 to be cooled.

Reference numeral 6 indicates a turbine chamber which surrounds a connected part of air compressor 1, gas turbine 2, and combustor 4. Reference numeral 7 indicates a steam path for introducing cool steam, which is supplied from a steam source (not shown) via closing/opening valve 8, into the high-temperature portion 5 to be cooled.

Reference numeral 9 indicates an air duct which joins the turbine chamber 6 and steam path 7. A boost-up pressurizer 10 and closing/opening valve 11 are inserted in the path of the air duct.

FIG. 1 shows only the relevant parts in the gas turbine plant of the combined cycle power plant. The whole arrangement of the combined cycle power plant including the whole structure of the gas turbine plant, the steam turbine plant, and the exhaust heat recovery boiler are not shown and explanations thereof are omitted.

In the structure of the present embodiment explained above, when the gas turbine is activated or stopped, the closing/opening valve 8 is closed so as to close the path for supplying cool steam, while the closing/opening valve 11 is opened so as to communicate the turbine chamber 6 with the steam path 7 via the air duct 9. In this way, the compressed air supplied from the air compressor 1 to turbine chamber 6 is supplied to the high-temperature portion 5 (to be cooled) of combustor 4.

During this process, the pressure of the compressed air is increased using the boost-up pressurizer 10 provided in the supply path of the compressed air; thus, the compressed air supplied to the high-temperature portion 5 has a pressure higher than that measured when the compressed air was supplied from the air compressor 1 to turbine chamber 6.

Because of the pressure loss of air while passing through the relevant paths, the compressed air supplied from the air compressor 1 via turbine chamber 6 to combustor 4 has a pressure lower than that of compressed air which is directly supplied from the turbine chamber 6 to combustor 4. However, the pressure of the compressed air from the turbine chamber 6 is increased using the boost-up pressurizer 10 so that the pressure of the compressed air supplied to the high-temperature portion 5 to be cooled of the combustor 4 is reliably maintained at a sufficiently high level.

Therefore, according to the present embodiment, it is possible to prevent the combustion gas from being introduced into the cooling path (including the high-temperature portion 5 or steam path 7) and to prevent the combustor 4 and attached piping arrangement from being locally heated or burned.

The present invention is not limited to the shown embodiment explained above, but each element in the embodiment can be variously modified within the scope of the claimed invention.

INDUSTRIAL APPLICABILITY

According to the present invention, if the cooling steam is in short supply when the gas turbine is activated, stopped, or the like, the combustor and appended piping arrangement can be prevented from burning. Therefore, a plant having long-term reliability and operability can be obtained, and thus the reliability of the plant can be remarkably improved.

What is claimed is:

1. A combined cycle power plant having a gas turbine plant and a steam turbine plant combined together, the combined cycle power plant comprising:

an exhaust heat recovery boiler for generating steam for driving the steam turbine by using exhaust heat from the gas turbine;

a combustor provided for the gas turbine and having a high temperature compartment surrounding the combustor; and a steam cooling system for cooling the high-temperature compartment of the combustor by using the steam, where superheated steam from the steam cooling system is recovered and used in the steam turbine, wherein the combined cycle power plant has an air duct connected to a steam path for supplying steam for cooling the high-temperature compartment of the combustor and provided for cooling the high-temperature compartment by extracting and supplying air from compressed air in a turbine chamber surrounding the combustor when the steam for cooling is insufficient, and the air duct including a booster for boosting the air to have a pressure higher than a pressure inside said combustor.

2. A combined cycle power plant as claimed in claim 1, wherein the booster for boosting the air is a boost-up pressurizer.

3. A combined cycle power plant having a gas turbine plant and a steam turbine plant plant combined together, the combined cycle power plant comprising:

a combustor for the gas turbine, said combustor having a high temperature compartment surrounding said combustor;

an exhaust heat recovery boiler positioned and configured to generate steam for driving the steam turbine by using exhaust heat from the gas turbine;

a steam cooling path positioned and configured to supply the steam used in the steam turbine into said high temperature compartment of said combustor for cooling;

an air duct communicating with the steam path and configured to extract and supply air from compressed air in a turbine chamber surrounding said combustor into the high-temperature compartment of said combustor; and means for boosting the air, wherein the air is compressed by said means for boosting the air to a pressure higher than a pressure inside said combustor.

4. A combined cycle power plant as claimed in claim 3, wherein:

said gas turbine plant comprises the turbine chamber connecting said combustor and said gas turbine; and said means for boosting the air intakes the air from inside said turbine chamber.

5. A combined cycle power plant as claimed in claim 3, further comprising:

a first valve disposed in said steam cooling path; and a second valve disposed in said air duct, wherein said first valve is closed while said second valve is opened during a start-up stage of said combined cycle power plant, and the air is used to cool the high temperature compartment during the start-up stage.

6. A combined cycle power plant as claimed in claim 5, wherein said first valve is closed while said second valve is opened during a shut-off stage of said combined cycle power plant, and the air is used to cool the high temperature compartment during the shut-off stage.

7. A combined cycle power plant having a gas turbine plant and a steam turbine plant combined together, the combined cycle power plant comprising:

a combustor for the gas turbine, said combustor having a high temperature compartment surrounding said combustor;

an exhaust heat recovery boiler positioned and configured to generate steam for driving the steam turbine by using exhaust heat from the gas turbine;

a steam cooling path positioned and configured to supply the steam used in the steam turbine into said high temperature compartment of said combustor for cooling;

an air duct communicating with the steam path and configured to extract and supply air from compressed air in a turbine chamber surrounding said combustor for cooling the high-temperature compartment; and a boost-up pressurizer disposed inside said air duct and configured to compress the air from a turbine chamber to a higher pressure than a pressure inside said combustor.

8. A combined cycle power plant as claimed in claim 7, wherein:

said gas turbine plant comprises the turbine chamber connecting said combustor and said gas turbine; and said means for boosting the air intakes the air from inside said turbine chamber.

9. A combined cycle power plant as claimed in claim 7, further comprising:

a first valve disposed in said steam cooling path; and a second valve disposed in said air duct, wherein said first valve is closed while said second valve is opened during a start-up stage of said combined cycle power plant, and the air is used to cool the high temperature compartment during the start-up stage.

10. A combined cycle power plant as claimed in claim 9, wherein said first valve is closed while said second valve is opened during a shut-off stage of said combined cycle power plant, and the air is used to cool the high temperature compartment during the shut-off stage.

* * * * *